(12) United States Patent
Davis

(10) Patent No.: US 9,976,698 B1
(45) Date of Patent: May 22, 2018

(54) MULTI-ANGLE TELEVISION WALL MOUNT

(71) Applicant: Claude Davis, Elizabeth, NJ (US)

(72) Inventor: Claude Davis, Elizabeth, NJ (US)

(*) Notice: Subject to any disclaimer, the term of this patent is extended or adjusted under 35 U.S.C. 154(b) by 0 days. days.

(21) Appl. No.: 15/284,507

(22) Filed: Oct. 3, 2016

Related U.S. Application Data

(60) Provisional application No. 62/236,975, filed on Oct. 5, 2015.

(51) Int. Cl.
| | | |
|---|---|---|
| *F16M 13/02* | (2006.01) | |
| *F16M 11/12* | (2006.01) | |
| *F16M 11/20* | (2006.01) | |
| *H05K 5/00* | (2006.01) | |
| *H05K 5/02* | (2006.01) | |

(52) U.S. Cl.
CPC .......... *F16M 13/02* (2013.01); *F16M 11/125* (2013.01); *F16M 11/2064* (2013.01); *H05K 5/0017* (2013.01); *H05K 5/0204* (2013.01); *F16M 2200/022* (2013.01); *F16M 2200/024* (2013.01); *F16M 2200/068* (2013.01)

(58) Field of Classification Search
CPC .. F16M 13/02; F16M 11/125; F16M 11/2064; F16M 2200/022; F16M 2200/024; F16M 2200/068; H05K 5/0017; H05K 5/0204
See application file for complete search history.

(56) References Cited

U.S. PATENT DOCUMENTS

| | | | | |
|---|---|---|---|---|
| 1,682,180 A * | 8/1928 | Merrill | ................. | A47B 23/025 248/285.1 |
| 2,466,722 A * | 4/1949 | May | ..................... | F21V 21/26 248/278.1 |
| 4,592,526 A * | 6/1986 | Kobelt | .................... | F16C 11/10 248/284.1 |
| 5,429,336 A * | 7/1995 | Ko | ......................... | F16M 11/10 248/278.1 |
| 6,695,270 B1 * | 2/2004 | Smed | .................... | F16M 11/10 248/274.1 |
| 7,207,537 B2 * | 4/2007 | Hung | .................... | F16M 11/10 248/274.1 |
| 7,959,120 B2 * | 6/2011 | Liao | .................... | B60R 11/0252 248/122.1 |
| 2004/0159757 A1 * | 8/2004 | Pfister | ................... | F16M 11/10 248/284.1 |
| 2006/0273231 A1 * | 12/2006 | Huang | ................... | F16M 11/10 248/371 |
| 2007/0095992 A1 * | 5/2007 | Dozier | ................... | F16M 11/10 248/276.1 |
| 2008/0029669 A1 * | 2/2008 | Olah | ................... | B60R 11/0229 248/276.1 |
| 2008/0100996 A1 * | 5/2008 | Wang | ..................... | H04N 5/64 361/679.06 |
| 2009/0212184 A1 * | 8/2009 | Bourgeois | ............. | F16M 11/10 248/288.11 |

* cited by examiner

*Primary Examiner* — Anita M King

(57) ABSTRACT

A multi-angled television wall mount is a television mounting system that is adapted to have extension arms with multiple angle adjustments for mounting a television to irregularly angled wall or ceiling surfaces. The mounting system has two vertical angle adjustments and two horizontal angle adjustments.

1 Claim, 5 Drawing Sheets

MULTI-ANGLE TELEVISION WALL MOUNT

CROSS-REFERENCE TO RELATED APPLICATION

The present application is related to and claims priority from prior provisional application Ser. No. 62/236,975, filed Oct. 5, 2015 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of television mounts and more specifically relates to multi-angled television wall mount.

2. Description of the Related Art

The global television manufacturing industry is highly dynamic in nature. Technological advancement and replacement plays a vital role in the industry's growth. The industry experienced an exponential growth during 2006-2011 and is expected to have good growth over 2012-2017 to reach an estimated 199 billion by 2017. Approximately 67 million TV sets were sold worldwide in 2012, and that number is expected to hit 87 million this year. In 2009, 78 percent of the world's households owned at least one television set, an increase of 5% over 2003 with 400 million sets in China and over 200 million sets in the U.S. It is estimated that at least 50% of these sets will be wall mounted.

Choosing a flat panel TV wall mount can be a difficult decision because there are many different sizes, brands, and types of mounts. Choosing the wrong mount can cause you hours of frustration as you try to get it to work properly or just end up returning it and starting over. There are three common types of mounts, low profile, tilting and full-motion/articulating. A low-profile mount is used when you want the TV as close to the wall as possible. They do not tilt or swivel at all, but are typically the least expensive of any type of mount. Unfortunately, in some cases the TV is so close to the wall that you cannot get the cables to plug in. If the cable connections are on the back of the TV, facing the wall, you will need 90 degree adapters and will have to use spacers to bring the TV out from the wall.

A tilting wall mount mounts very close to the wall; many tilting wall mounts are actually considered "low-profile tilting". These mounts can typically handle more weight than a full-motion design and provide for easier installation. The TV does not actually move up or down on the wall, just tilts up or down and it typically cannot be pulled out from the wall. This is sometimes but not always a great choice if the TV the being mounted above eye level. Full-motion articulating wall mounts give you the ability to pull your TV out from the wall and swivel it any direction. They can also tilt up or down, and push back flat against the wall when you want. Full-motion mounts are great for corner installations. They also work well for mounting a TV in old cabinets that were made for a deep CRT television.

The mount can attach to the back of the cabinet and the arm will bring the TV flush to the front, making it look like the TV is floating. These mounts are typically more expensive and slightly more difficult to install than tilting or low-profile options. Some dual arm full-motion mounts can pull out from the wall up to 30" or more, while the less expensive single arm options typically come out about 10". With all of these options, nothing on the market today allows for mounting a flat panel TV on an angled wall.

Various attempts have been made to solve the above-mentioned problems such as those found in U.S. Pat. No. 7,905,460 to Alan Woods; U.S. Pat. No. 7,738,245 to Matthew William Stifal; and U.S. Publication No. 2007/0041150 to Mark Short. None of the above inventions and patents, taken either singly or in combination, is seen to describe the invention as claimed.

Ideally, a television mount should provide complete versatility of mounting a television to any angled surface, and yet, would operate reliably and be manufactured at a modest expense. Thus, a need exists for a reliable multi-angled television wall mount to avoid the above-mentioned problems.

BRIEF SUMMARY OF THE INVENTION

In view of the foregoing disadvantages inherent in the known television mount art, the present invention provides a novel multi-angled television wall mount. The general purpose of the present invention, which will be described subsequently in greater detail, is to provide complete versatility of mounting a television to any angled surface.

The multi-angled television wall mount is useful for mounting a television to a user preferred surface and adjusting the television to a user preferred height, a user preferred horizontal angle, and a user preferred television tilt angle to adapt to adjust the viewing angle of the television.

The multi-angled television wall mount may comprise a base mount bracket having a first side and a second side, a first adjustable angle joint having a first half and a second half, a first adjustable angle quick release, a first arm member having a first end and a second end, a second adjustable angle joint having a top half and a bottom half, a second adjustable angle quick release, a second arm member having a proximal end and a distal end, a third adjustable angle joint having an upper half and a lower half, and a television bracket having a back side and a front side.

The first side of the base mount bracket is attachable to a wall and the second side of the base mount bracket is rigidly attached to the first half of the first adjustable angle joint. The second half of the first adjustable angle joint is attached to the first half of the first adjustable angle joint and is adapted to be vertically rotatable in relation to the base mount bracket. The first end of the first arm member is rigidly attached to the second half of the first adjustable angle joint and the second end of the first arm member is rigidly attached to the bottom half of the second adjustable angle joint. The bottom half of the second adjustable angle joint is rotatably attached to the top half of the second adjustable angle joint and is adapted to be horizontally rotatable in relation to each other. The distal end of the second arm member is rigidly attached to the top half of the second adjustable angle joint and the proximal end of the second arm member is rigidly attached to the upper half of the third adjustable angle joint. The upper half of the third adjustable angle joint is rotatably attached to the lower half of the third adjustable angle joint and both are adapted to be horizontally rotatable in relation to each other. The lower half of the third adjustable angle joint is attached to the back side of the television bracket and is adapted to be adjustable in angle in relation to the upper half of the third adjustable angle joint.

The front side of the television bracket is adapted to be attachable to the back side of a television. The television bracket is preferably a universal mount television bracket so that most makes and models of televisions may be attached. The first half and the second half of the first adjustable angle joint are each adapted to have a circular toothed gear set each having a plurality of facing teeth that are designed to mesh together. The first half of the first adjustable angle joint is adapted to have a threaded hole concentrically passing therethrough and the second half of the first adjustable angle joint is adapted to have a hole concentrically passing through such that the locking bolt is able pass through the second half of the first adjustable angle joint and to thread into the threaded hole of the first half of the first adjustable angle joint to lock the first half and the second half together when tightened, via the facing circular toothed gear sets.

The first half is rigidly mounted to the base plate and the second half is rotatable with the first arm member. The first adjustable angle joint is adapted to have a horizontal axis such that any movement between the first half and the second half is along a vertical plane. The second adjustable angle joint is adapted to have a vertical axis such that movement between the top half and the bottom half is along a horizontal plane. The third adjustable angle joint is also adapted to have a vertical axis such that movement between the upper half and the lower half is along a horizontal plane as well.

The back side of the television bracket further comprises a u-bracket having two arcuately shaped portions extending rearward, the two arcuately shaped portions having an arcuately shaped slotted throughhole for adjustment of a forward tilt angle of the television. The base mount bracket further comprises two fastener holes for fastening the base mount bracket to a user preferred surface. The bracket may be mounted to a vertical wall, a flat ceiling, or a sloped ceiling. The assembly has enough angle adjustments to compensate for nearly any mounting angle.

The locking bolt for the first adjustable angle joint further comprises a T-handle having a substantially lens shaped cross-section for gripping and tightening the locking bolt to lock the first adjustable angle joint at a user preferred vertical height. The first arm member, the base mount bracket, the first adjustable angle joint, the second adjustable angle joint, the second arm member, the third adjustable angle joint, and the television bracket are each made of metal for rigidity. The second adjustable angle joint and the third adjustable angle joint each have a vertically deposed hinge pin that pivotally attaches the first half and the second half.

The lower half of the third adjustable angle joint is adapted to have a cylindrical rod passing laterally therethrough, the cylindrical rod slideably engages with the arcuately shaped slotted throughholes of the arcuately shaped portions of the u-bracket on the back side of the television bracket such that the television is able to be tilted forward or backward to a user preferred angle.

The multi-angled television wall mount may comprise a kit having at least one multi-angled television wall mount with a first arm member, a base mount bracket, a first adjustable angle joint, a second adjustable angle joint, a second arm member, a third adjustable angle joint, and a television bracket, a flat screen television, at least one set of fasteners, and at least one set of user instructions.

A method of using a multi-angled television wall mount may comprise the steps of loosening the locking bolt of the first adjustable angle joint, adjusting the vertical angle of the first arm member; tightening the locking bolt to lock the first adjustable angle joint, rotating the second arm member horizontally to a user preferred angle; rotating the television bracket horizontally to a user preferred angle, loosening the wing-nut and adjusting the television tilt angle, tightening the wing-nut, and watching the television.

The present invention holds significant improvements and serves as a multi-angled television wall mount. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, multi-angled television wall mount, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a television mount and more particularly to a multi-angled television wall mount as used to improve the versatility of mounting a television to irregular angled ceiling or wall surfaces.

Generally speaking, multi-angled television wall mount is a television mounting system that is adapted to have extension arms with multiple angle adjustments for mounting a television to irregularly angled wall or ceiling surfaces. The mounting system has two vertical angle adjustments and two horizontal angle adjustments.

Figure 1:
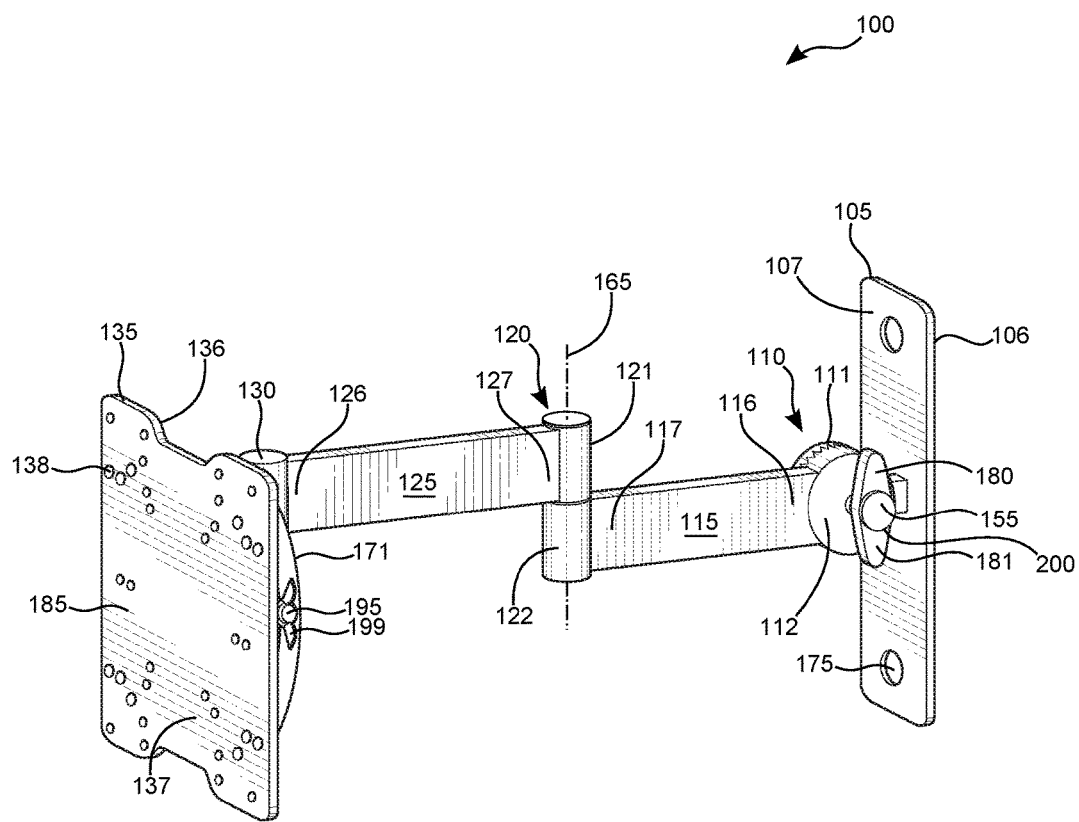
FIG. 1 shows a perspective view illustrating a multi-angled television wall mount according to an embodiment of the present invention.

Referring to the drawings by numerals of reference there is shown in FIG. 1, a perspective view illustrating multi-angled television wall mount 100 according to an embodiment of the present invention.

Multi-angled television wall mount 100 is useful for mounting a television to a user preferred surface and adjusting the television to a user preferred height, a user preferred horizontal angle, and a user preferred television tilt angle to adjust the viewing angle of the television. Multi-angled television wall mount 100 may comprise base mount bracket 105 having first side 106 and second side 107, first adjustable angle joint 110 having first half 111 and second half 112, first adjustable angle quick release 200, first arm member 115 having first end 116 and second end 117, second adjustable angle joint 120 having top half 121 and bottom half 122, second adjustable angle quick release 205, second arm member 125 having proximal end 126 and distal end 127, third adjustable angle joint 130 having upper half 131 and lower half 132, and television bracket 135 having back side 136 and front side 137. The first 110, second 120, and third 130 adjustable angle joint and the forward tilt angle are key features of multi-angled television wall mount 100 providing versatility of mounting on odd angled surfaces such as angled ceilings and walls that are not vertical or horizontal. The television can be placed and positioned to adapt to nearly any situation. In more detail on the angular capabilities of multi-angled television wall mount 100, first adjustable angle joint 110 is adapted to have horizontal axis 160 such that any movement between first half 111 and second half 112 is along a vertical plane. Second adjustable angle joint 120 is adapted to have vertical axis 165 such that movement between top half 121 and bottom half 122 is along a horizontal plane. Third adjustable angle joint 130 is also adapted to have vertical axis 165 such that movement between upper half 131 and lower half 132 is along a horizontal plane as well. Then television bracket 135 is able to angle forward or backward in addition to the vertical angle adjustment of first adjustable angle joint 110. First adjustable angle joint 110 is constructed to be rotatable throughout 360 degrees and when mounted to a surface, the range of motion for first adjustable angle joint 110 is approximately 103 degrees.

Figure 2:
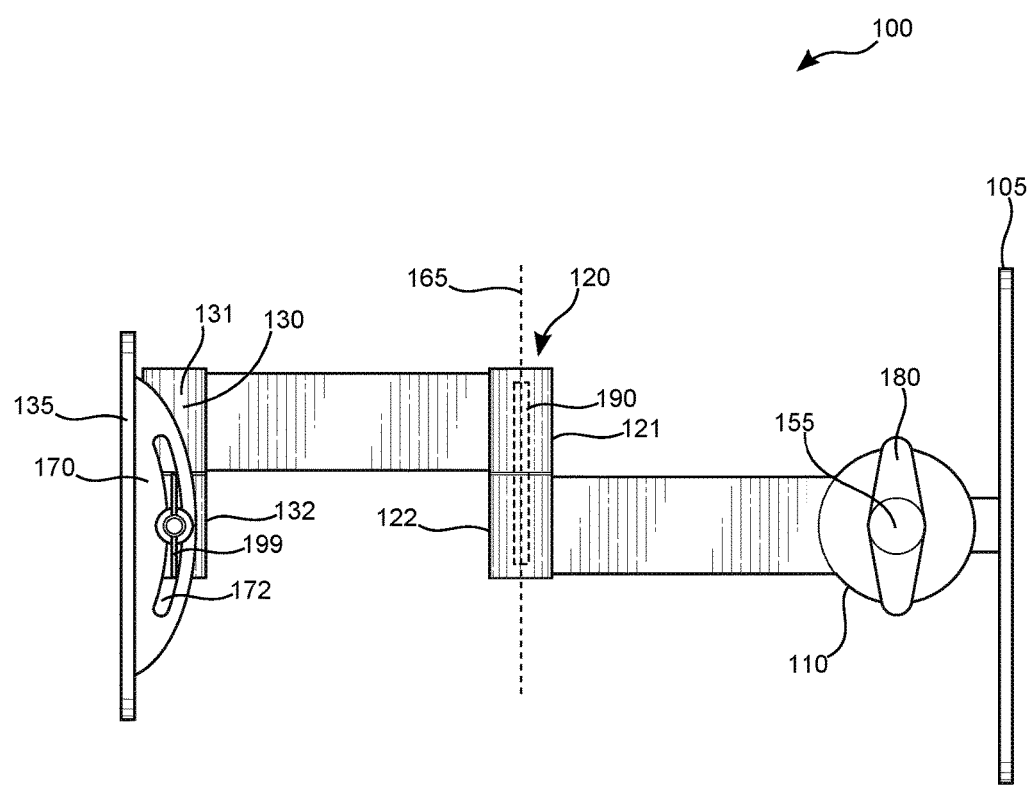
FIG. 2 is a right side view illustrating the multi-angled television wall mount according to an embodiment of the present invention of FIG. 1.

Referring now to FIG. 2, is a right side view illustrating multi-angled television wall mount 100 according to an embodiment of the present invention of FIG. 1.

First side 106 of base mount bracket 105 is attachable to a wall and second side 107 of base mount bracket 105 is rigidly attached to first side 106 of first adjustable angle joint 110. Second half 112 of first adjustable angle joint 110 is attached to first half 111 of first adjustable angle joint 110 and is adapted to be vertically rotatable in relation to base mount bracket 105. First end 116 of first arm member 115 is rigidly attached to second half 112 of first adjustable angle joint 110 and second end 117 of first arm member 115 is rigidly attached to bottom half 122 of second adjustable angle joint 120. Bottom half 122 of second adjustable angle joint 120 is rotatably attached to top half 121 of second adjustable angle joint 120 and is adapted to be horizontally rotatable in relation to each other. Distal end 127 of second arm member 125 is rigidly attached to top half 121 of second adjustable angle joint 120 and proximal end 126 of second arm member 125 is rigidly attached to upper half 131 of third adjustable angle joint 130. Upper half 131 of third adjustable angle joint 130 is rotatably attached to lower half 132 of third adjustable angle joint 130 and both are adapted to be horizontally rotatable in relation to each other. Second adjustable angle joint 120 and third adjustable angle joint 130 each have a vertically deposed hinge pin 190 that pivotally attaches first half 111 and second half 112. Lower half 132 of third adjustable angle joint 130 is attached to back side 136 of television bracket 135 and is adapted to be adjustable in angle in relation to upper half 131 of third adjustable angle joint 130.

Back side 136 of television bracket 135 further comprises u-bracket 170 having two arcuately shaped portions 171 extending rearward, arcuately shaped portions 171 having an arcuately shaped slotted throughhole 172 for adjustment of a forward tilt angle of the television. Base mount bracket 105 further comprises two fastener holes 175 for fastening base mount bracket 105 to a user preferred surface. Base mount bracket 105 may be mounted to a vertical wall, a flat ceiling, or a sloped ceiling. Multi-angled television wall mount 100 has enough angle adjustments to compensate for nearly any mounting angle. First arm member 115, base mount bracket 105, first adjustable angle joint 110, second adjustable angle joint 120, second arm member 125, third adjustable angle joint 130, and television bracket 135 are preferably each made of metal for rigidity.

Figure 3:
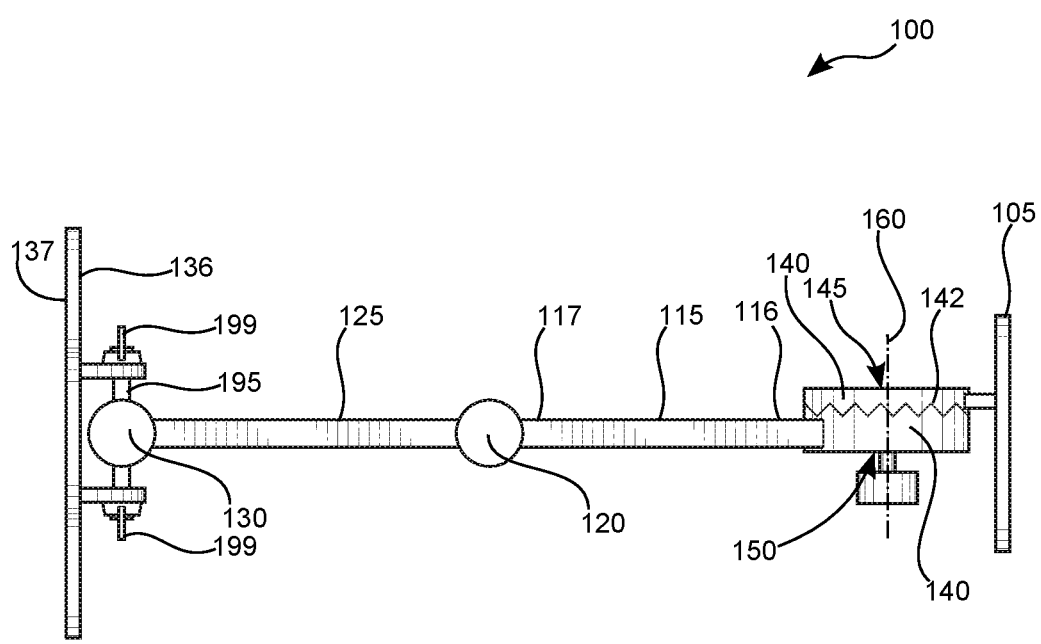
FIG. 3 is a top plan view illustrating the multi-angled television wall mount according to an embodiment of the present invention of FIG. 1.

Referring now to FIG. 3, is a top plan view illustrating the multi-angled television wall mount 100 according to an embodiment of the present invention of FIG. 1.

First side 106 of base mount bracket 105 is attachable to a wall and second side 107 of second side 107 is rigidly attached to first half 111 of first adjustable angle joint 110. Second half 112 of first adjustable angle joint 110 is attached to first half 111 of first adjustable angle joint 110 and is adapted to be vertically rotatable in relation to base mount bracket 105. First half 111 of first adjustable angle joint 110 is rigidly mounted to base mount bracket 105 and second half 112 is rotatable with first arm member 115. First end 116 of first arm member 115 is rigidly attached to second half 112 of first adjustable angle joint 110 and second end 117 of first arm member 115 is rigidly attached to bottom half 122 of second adjustable angle joint 120. Bottom half 122 of second adjustable angle joint 120 is rotatably attached to top half 121 of second adjustable angle joint 120 and is adapted to be horizontally rotatable in relation to each other. Distal end 127 of second arm member 125 is rigidly attached to top half 121 of second adjustable angle joint 120 and proximal end 126 of second arm member 125 is rigidly attached to upper half 131 of third adjustable angle joint 130. Upper half 131 of third adjustable angle joint 130 is rotatably attached to lower half 132 of third adjustable angle joint 130 and both are adapted to be horizontally rotatable in relation to each other. Lower half 132 of third adjustable angle joint 130 is attached to back side 136 of television bracket 135 and is adapted to be adjustable in angle in relation to upper half 131 of third adjustable angle joint 130. Lower half 132 of third adjustable angle joint 130 is adapted to have cylindrical rod 195 passing laterally therethrough, cylindrical rod 195 slideably engages with the arcuately shaped slotted throughhole 172 of the arcuately shaped portions 171 of u-bracket 170 on back side 136 of television bracket 135 such that the television is able to be tilted forward or backward to a user preferred angle. The angle is locked by tightening wing nut 199 threaded onto cylindrical rod. First half 111 and second half 112 of first adjustable angle joint 110 are each adapted to have circular toothed gear set 140 each having a plurality of facing teeth 142 that are designed to mesh together. First half 111 of first adjustable angle joint 110 is adapted to have threaded hole 145 concentrically passing therethrough and second half 112 of first adjustable angle joint 110 is adapted to have throughhole 150 concentrically passing through such that locking bolt 155 is able pass through second half 112 of first adjustable angle joint 110 and to thread into threaded hole 145 of first half 111 of first adjustable angle joint 110 to lock first half 111 and second half 112 together when tightened, via the facing circular toothed gear set 140. Locking bolt 155 for first adjustable angle joint 110 further comprises T-handle 180 having a substantially lens shaped cross-section 181 for gripping and tightening locking bolt 155 to lock first adjustable angle joint 110 at a user preferred vertical height.

Figure 4:
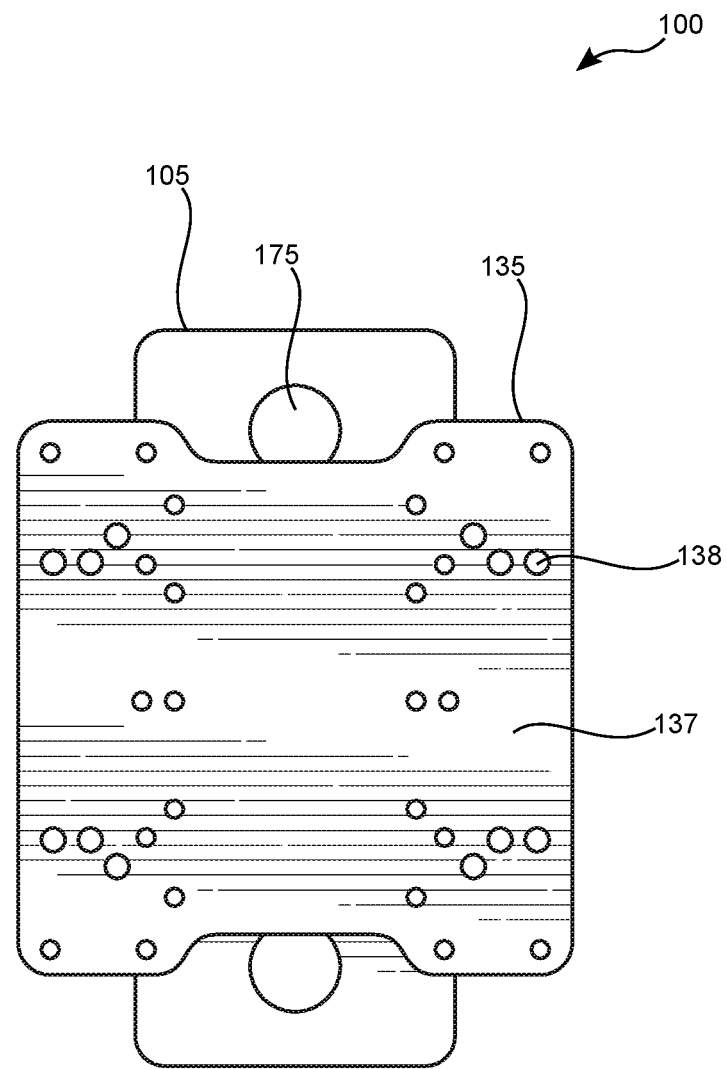
FIG. 4 is a front elevation view illustrating multi-angled television wall mount according to an embodiment of the present invention of FIG. 1.

Referring now to FIG. 4, is a front elevation view illustrating multi-angled television wall mount 100 according to an embodiment of the present invention of FIG. 1.

First side 106 of television bracket 135 is adapted to be attachable to back side 136 of a television. Television bracket 135 is preferably a universal mount television bracket 185 so that most makes and models of televisions may be attached. A plurality of mounting holes 138 for the television set is shown in this figure and preferably, mounting holes 138 are multiple different mounting patterns for multiple different makes and models of television sets. Spacers may also be provided for the major models that require spaces because they configured to mount to a non-flat surface. A plurality of spacers may be provided for stacking on the mounting fasteners as needed.

Multi-angled television wall mount 100 may be sold as kit comprising the following parts: at least one multi-angled television wall mount 100 with first arm member 115, base mount bracket 105, first adjustable angle joint 110, second adjustable angle joint 120, second arm member 125, third adjustable angle joint 130, and television bracket 135; at least one flat screen television; at least one set of fasteners; and at least one set of user instructions. The kit has instructions such that functional relationships are detailed in relation to the structure of the invention (such that the invention can be used, maintained, or the like in a preferred manner). Multi-angled television wall mount 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
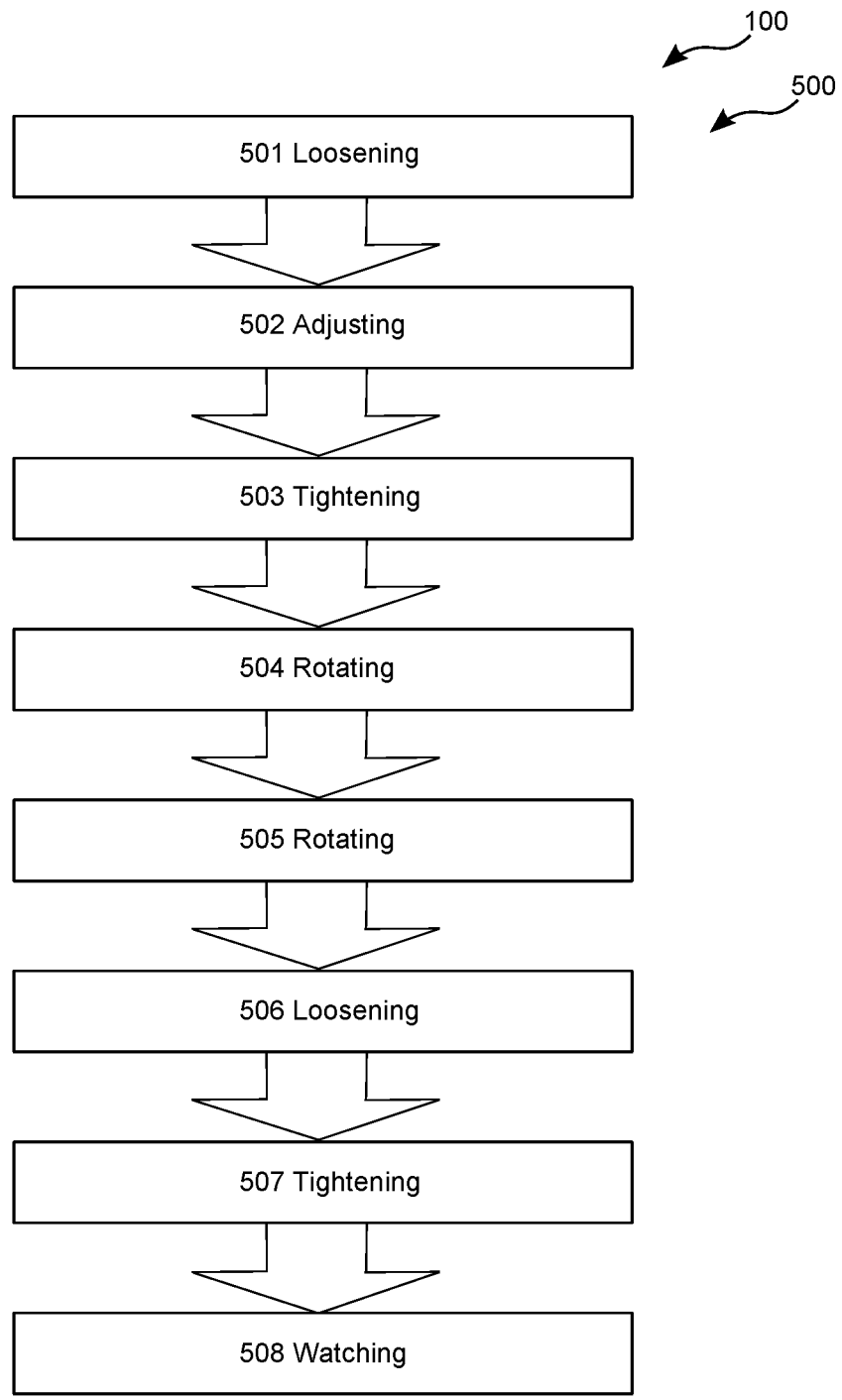
FIG. 5 is a flowchart illustrating a method of use for multi-angled television wall mount according to an embodiment of the present invention of FIGS. 1-4.

Referring now to FIG. 5, showing method of use 500 for multi-angled television wall mount 100. A method of using multi-angled television wall mount 100 may comprise the steps of step one 501 loosening locking bolt 155 of first adjustable angle joint 110; step two 502 adjusting the vertical angle of first arm member 115; step three 503 tightening locking bolt 155 to lock first adjustable angle joint 110; step four 504 rotating second arm member 125 horizontally to a user preferred angle; step five 505 rotating television bracket 135 horizontally to a user preferred angle; step six 506 loosening wing nut 199 and adjusting the television tilt angle; step seven 507 tightening wing nut 199; step eight 508 and watching the television.

It should be noted that steps 501-507 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. § 112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A multi-angled television wall mount comprising:
   a base mount bracket having a first side and a second side;
   a first adjustable angle joint having a first half and a second half;
   a first arm member having a first end and a second end;
   a second adjustable angle joint having a top half and a bottom half;
   a second arm member having a proximal end and a distal end;
   a third adjustable angle joint having an upper half and a lower half; and
   a television bracket having a back side and a front side;
   wherein said first side of said base mount bracket is attachable to a wall and a second side of said base mount bracket is rigidly attached to said first half of said first adjustable angle joint;
   wherein said second half of said first adjustable angle joint is attached to said first half of said first adjustable angle joint and is adapted to be vertically rotatable in relation to said base mount bracket;
   wherein said first end of said first arm member is rigidly attached to said second half of said first adjustable angle joint;
   wherein said second end of said first arm member is rigidly attached to said bottom half of said second adjustable angle joint;
   wherein said bottom half of said second adjustable angle joint is rotatably attached to said top half of said second adjustable angle joint and is adapted to be horizontally rotatable in relation to each other;
   wherein said distal end of said second arm member is rigidly attached to said top half of said second adjustable angle joint;

wherein said proximal end of said second arm member is rigidly attached to said upper half of said third adjustable angle joint;

wherein said upper half of said third adjustable angle joint is rotatably attached to said lower half of said third adjustable angle joint and is adapted to be horizontally rotatable in relation to each other;

wherein said lower half of said third adjustable angle joint is attached to said back side of said television bracket and is adapted to be adjustable in angle in relation to said upper half of said third adjustable angle joint;

wherein said front side of said television bracket is adapted to attachable to a back side of a television;

wherein said television bracket is a universal mount television bracket wherein said first half and said second half of said first adjustable angle joint are each adapted to have a circular toothed gear set each having a plurality of teeth that are designed to mesh together;

wherein said first half of said first adjustable angle joint is adapted to have a threaded hole concentrically passing therethrough;

wherein said second half of said first adjustable angle joint is adapted to have a hole concentrically passing therethrough such that a locking bolt is able pass through and to thread into said threaded hole of said first half of said first adjustable angle joint to lock said first half and said second half of said first adjustable angle joint together via said circular toothed gear sets;

wherein said first adjustable angle joint is adapted to have a horizontal axis such that a movement between said first half and said second half is along a vertical plane;

wherein said second adjustable angle joint is adapted to have a vertical axis such that a movement between said top half and said bottom half is along a horizontal plane;

wherein said third adjustable angle joint is adapted to have a vertical axis such that a movement between said upper half and said lower half is along a horizontal plane;

wherein said back side of said television bracket further comprises a u-bracket having two arcuately shaped portions extending rearward, said two arcuately shaped portions having an arcuately shaped slotted throughhole for adjustment of a forward tilt angle of said television;

wherein said base mount bracket further comprises two fastener holes for fastening said base mount bracket to said user preferred surface;

wherein said locking bolt for said first adjustable angle joint further comprises a T-handle having a substantially lens shaped cross-section for tightening said locking bolt to lock said first adjustable angle joint at a user preferred vertical height;

wherein said first arm member, said base mount bracket, said first adjustable angle joint, said second adjustable angle joint, said second arm member, said third adjustable angle joint, and said television bracket are each made of metal for rigidity;

wherein said second adjustable angle joint and said third adjustable angle joint each have a vertically deposed hinge pin that pivotally attaches said first half and said second half;

wherein said lower half of said third adjustable angle joint is adapted to have a cylindrical rod passing laterally therethrough, said cylindrical rod is slideably engaged with said arcuately shaped slotted throughholes of said arcuately shaped portions of said u-bracket on said back side of said television bracket such that said television is able to be forward tilted therewith; and wherein said multi-angled television wall mount is useful for mounting a television to a user preferred surface and adjusting said television to a user preferred height, a user preferred horizontal angle, and a user preferred television tilt angle.

* * * * *